3,259,470
APPARATUS FOR MANUFACTURING SHAPES OF URANIUM CARBIDE

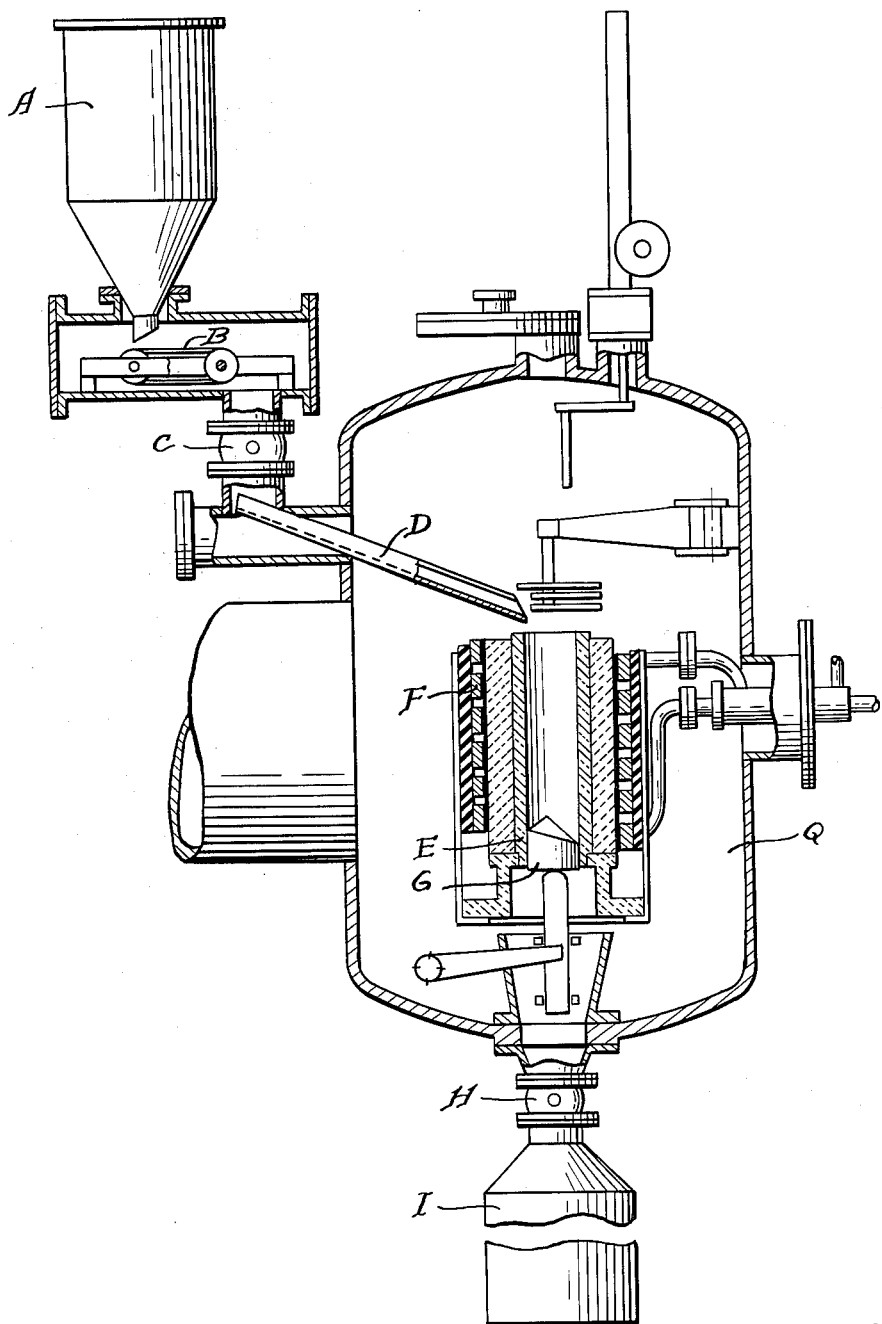

Friedrich Hofmann, Geretsried, Upper Bavaria, and Lothar Schafer, Klein Auheim, Germany, assignors to the United States of America as represented by the United States Atomic Energy Commission
Filed Aug. 9, 1963, Ser. No. 301,215
Claims priority, application Germany, Aug. 10, 1962, E 23,368
1 Claim. (Cl. 23—277)

The invention described herein was made in the course of, or under, a contract with the United States Atomic Energy Commission.

The invention relates to a process for the production of shapes from metal carbides, particularly from uranium carbide, by thermal reaction of compacted bodies composed of a mixture of metal oxide and graphite.

Uranium carbide, in the form of cast rods, can serve as fuel for nuclear reactors. The rods can be made, for example, by melting and casting in an arc furnace. As starting material for the melting, by way of example, a uranium carbide is used which is produced by means of the reaction $$UO_2 + 3C \rightarrow UC + 2CO$$

at 1700° C. in a vacuum induction furnace.

Since the possibility of using uranium carbide as nuclear fuel is determined, inter alia, by production costs, it is of decisive importance to make the process as economical as possible in all stages of production including that of the reaction in accordance with the above equation.

It is known to produce uranium carbide by mixing and compacting uranium dioxide and graphite into bodies, introducing these bodies into a graphite crucible and heating them in this crucible in an induction furnace to temperatures of from 1600 to 1800° C. The operations must be carried out in a vacuum, because uranium dioxide and graphite react completely in accordance with the above equation only if the carbon monoxide pressure at all times is less than the equilibrium pressure for the reaction, which is approximately 5 Torr at 1700° C. After completion of the reaction, the crucible filled with uranium carbide shapes must be cooled to room temperature in the furnace, because of the danger of oxidation at elevated temperatures. The process has the drawback that long heating times and even longer cooling times are required for each charge. An increase in output is only possible to a certain extent, because the amount reactable per charge is limited by the size of the available pumps.

It has now been found that these disadvantages can be eliminated if the compacted bodies are introduced at the top of a shaft-like reaction chamber arranged in a vacuum furnace, reacted in this chamber to form uranium carbide shapes and then discharged from it at the bottom.

The hot shapes then fall from the shaft-like reaction chamber into a cooling vessel located outside the furnace without coming into contact with the outside atmosphere. While the shapes are being cooled in this vessel, fresh compacted bodies can be introduced into and reacted in the shaft-like reaction chamber.

Compacted bodies, consisting of a mixture of uranium oxide and graphite, are preferably introduced from an evacuatable container via a chute that leads the shapes into the upper aperture of the shaft-like reaction chamber. The evacuatable container is connected with the oven chamber.

By the process of this invention, the reaction can be performed practically continuously, so that the amount that can be processed per time unit is a multiple of that reactable by the processes known heretofore.

The drawing shows one embodiment of an apparatus for carrying out the process.

According to this drawing, the compacted bodies to be reacted are contained in a storage vessel A. By means of a conveyor belt B the compacted bodies are transported from this vessel A through a gate C into a tubular chute D, through which they slide over a sieve into a shaft-like graphite crucible E, which acts as a reaction chamber. This graphite crucible is located in the evacuated furnace casing Q, whereby the vacuum produced through a suction pipe at the same time reaches the structural parts A, C and D. The graphite crucible E is heated by an induction coil F, and the heat is transferred to the compacted bodies in the crucible. After completion of the reaction, the uranium carbide shapes produced are discharged from the crucible E in a downward direction by withdrawing the die-shaped bottom closure G of the crucible downwards. The uranium carbide shapes then fall into the cooling vessel I which is located outside the furnace. Between the cooling vessel I and the furnace casing Q there is a gate H.

It will be understood that the invention is not to be limited to the details given herein but that it may be modified within the scope of the appended claim.

What is claimed is:

An apparatus for manufacturing shapes of uranium carbide by heating bodies of a mixture of uranium oxide plus graphite, said apparatus comprising a storage vessel for said bodies, a conveyor belt for receiving the bodies from the storage vessel, a gate for receiving the bodies from the conveyor belt, a tubular chute for receiving the bodies from the gate, a vertical cylindrical reaction chamber of graphite, an induction coil for heating said reaction chamber, means for evacuating said chamber, means for discharging said shapes formed from said bodies at the bottom of said reaction chamber comprising a downwardly retractable, die-shaped seal, a gate for receiving the bodies from the die-shaped seal and a chamber for receiving the bodies from the gate and for cooling said shapes while maintaining them in a vacuum.

References Cited by the Examiner
UNITED STATES PATENTS

| | | | |
|---|---|---|---|
| 904,991 | 11/1908 | Price | 23—208 |
| 2,869,990 | 1/1959 | Burgess | 23—208 |
| 3,019,275 | 1/1962 | Lorenz | 13—26 |

OTHER REFERENCES

Goetzel, Treatise on Powder Metallurgy, vol. I, 1949, pp. 603–604 and 616.

Soviet Journal of Atomic Energy, Consultants Bureau Translation Uranium Monocarbide, vol. 9, No. 5, pp. 927–931, Sept. 1961.

Wilhelm et al., Journal of Chemical Society, Suppl. Issue 2, pages S318–321, 1949.

LEON D. ROSDOL, *Primary Examiner.*

CARL D. QUARFORTH, *Examiner.*

M. J. SKOLNICK, *Assistant Examiner.*